US009486108B1

(12) United States Patent
Douglas et al.

(10) Patent No.: US 9,486,108 B1
(45) Date of Patent: Nov. 8, 2016

(54) APPARATUS FOR DESCALING A SINGLE SERVE BEVERAGE FILTER CARTRIDGE MACHINE WITH APPLE VINEGAR WETTING COTTON IN A BEVERAGE FILTER CARTRIDGE

(71) Applicants: Shaun Douglas, Norwalk, CT (US); Daniel Depatie, New Canaan, CT (US)

(72) Inventors: Shaun Douglas, Norwalk, CT (US); Daniel Depatie, New Canaan, CT (US)

( * ) Notice: Subject to any disclaimer, the term of this patent is extended or adjusted under 35 U.S.C. 154(b) by 653 days.

(21) Appl. No.: 14/040,603

(22) Filed: Sep. 27, 2013

(51) Int. Cl.
*B65D 85/804* (2006.01)
*A47J 31/60* (2006.01)

(52) U.S. Cl.
CPC ............... *A47J 31/60* (2013.01); *B65D 85/804* (2013.01); *B65D 85/8046* (2013.01); *A23V 2250/022* (2013.01)

(58) Field of Classification Search
CPC ............ B65D 85/8046; B65D 85/804; A23V 2250/022
USPC ........................................................... 99/295
See application file for complete search history.

(56) References Cited

U.S. PATENT DOCUMENTS

| 5,173,125 A | 12/1992 | Felding |
| 5,472,719 A | 12/1995 | Favre |
| 8,216,385 B2 | 7/2012 | Dick |
| 8,382,907 B2 | 2/2013 | Dick |
| 2005/0051478 A1 | 3/2005 | Karanikos |

FOREIGN PATENT DOCUMENTS

WO      2013/188246      12/2013

OTHER PUBLICATIONS

U.S. Appl. No. 15/085,617.

*Primary Examiner* — Sean Michalski
(74) *Attorney, Agent, or Firm* — Hess Patent Law Firm; Robert J. Hess

(57) ABSTRACT

A container within which is a liquid absorbing material that is wetted by a wetting liquid. The liquid absorbing material has a liquid retention characteristic for retaining the vinegar—such that the liquid retention ability reduces as a surface tension of the wetting liquid reduces due to a temperature rise of the wetting liquid over time. The temperature rise of the wetting liquid comes about when heated water at a higher temperature than the wetted liquid comes into contact with the wetting liquid. Preferably the liquid absorbing material is cotton and the wetting liquid is vinegar, such as apple vinegar. The container has an open top closed by a cover and has a bottom. Both the open top and the cover are punctured to form an inlet and an outlet to allow the heated water to pass through to heat the vinegar and mix with it for cleaning a machine that uses single serving beverage filter cartridges.

20 Claims, 2 Drawing Sheets

APPARATUS FOR DESCALING A SINGLE SERVE BEVERAGE FILTER CARTRIDGE MACHINE WITH APPLE VINEGAR WETTING COTTON IN A BEVERAGE FILTER CARTRIDGE

BACKGROUND OF THE INVENTION

1. Field of the Invention

This invention relates to a closed container in which is an absorbing material such as cotton that is wetted by apple vinegar. The absorbing material retains the apple vinegar. The container is punctured when inserted into a machine that uses single serve beverage filter cartridges so as to allow hot water to pass through the container via the punctures. The hot water releases the vinegar from retention over time because of heat transfer that raises the temperature of the vinegar to break down its surface tension enabling its release to mix with the hot water. The mixture is suited to descale and clean flow passages of the machine in a cleaning procedure by removing all the excess grinds and muck that accumulated in the machine.

2. Description of the Prior Art

Inspiration

The inventors were displeased with the extensive amount of time it takes to descale and clean single serve beverage filter cartridge machines of accumulated excess grinds and muck if conventional cleaning instructions are carried out. In addition, they were displeased with the reliance on cleaning agents to carry out the descaling that are harmful if consumed since such cleaning agents are used to clean the same flow passages of machines used to brew beverages. In their view, users may harbor some fear as to whether drinking beverages from such machines is really safe for consumption immediately after the cleaning procedure is complete in the sense that they may fear there is a real risk that some residual cleaning agents remained within the flow passages that did not flush out so as to become mixed into the beverage in subsequent cycles. In other words, the perception of risk of consuming harmful cleaning agents remains—whether or not that really is the case cannot be resolved with certainty by the user prior to consuming the beverage. The user has nothing more to rely upon other than blind faith that the number of brewing cycles according to instructions from the supplier of the cleaning agents is enough to completely remove any residual cleaning agents.

The inventors are also aware that distilled vinegar is a household cleanser, killing most mold, germs and bacteria that it comes into contact with. Distilled vinegar, on the other hand, is safe to consume (at least in some doses). However, distilled vinegar has a fragrance or odor that is tolerable, but not particularly appealing to the sense of smell.

Machines that Utilize Disposable Single Serve Beverage Filter Cartridges

According to the online encyclopedia Wikipedia:

K-Cup portion packs are used with Keurig or other single cup brewing systems to brew a cup of coffee, tea, or hot chocolate. Each K-Cup is a plastic container with a coffee filter inside. Ground coffee beans are packed in the K-Cup and sealed air-tight with a combination plastic and foil lid. When the K-Cup is placed in a Keurig brewer, the brewer punctures the foil lid and the bottom of the K-Cup and forces hot water under pressure through the K-Cup and into a mug.

In this manner, the hot water leeches the flavor, color, aroma and stimulants of the coffee, tea or hot chocolate to form a desired beverage.

According to U.S. Pat. No. 6,645,537, which is incorporated herein by reference:

A known disposable single serve beverage filter cartridge is disclosed in expired U.S. Pat. Nos. 5,325,765 and 5,840,189 (Sylvan et al.), dated respectively Jul. 5, 1994 and Nov. 24, 1998, the disclosures of which are herein incorporated by reference.

This beverage filter cartridge is comprised basically of an impermeable yieldably-piercable cup-shaped outer container internally subdivided by a permeable cone-shaped filter into first and second chambers. A granular or powdered dry beverage medium, e.g., roasted ground coffee, is stored in the first chamber, and the container is closed by an impermeable yieldably piercable lid.

During a processing cycle, the lid and container bottom are pierced, respectively, by tubular inlet and outlet probes. The inlet probe admits heated liquid under pressure into the first chamber for infusion with the beverage medium, and the resulting brewed beverage passes through the filter into the second chamber from which it exits via the outlet probe for delivery to an underlying cup.

According to an online article dated Jul. 18, 2012 by Mandour & Associates on their website, the filter design covered in the two expiring patents has not been used since the inception of the K-Cup. According to the online article, pending patent application 2005/0051478, whose contents are incorporated herein by reference, is intended to protect the coffee filtration system utilized in the most recent version of the K-Cup currently in the marketplace.

Descaling the Coffee Maker

According to a webpage at coffeecow.com: http://www-.coffeecow.com/PublicPages/Articleinfo.aspx?ArticleID=18

Over time, mineral deposits accumulate inside your Keurig coffee machine. These mineral deposits make it more difficult for your Keurig to heat the water to the appropriate temperature for optimal brewing. The deposits also affect the taste of your coffee.

Keurig coffee brewers are extremely easy to use, and it's just as easy to descale a Keurig coffee machine. It is generally recommended that you descale once every six months (or every three months if you use hard water). To eliminate the guesswork, many Keurig coffee brewers flash a warning light to let you know descaling is needed.

Urnex CleanCup's new cleaning K-cups are made from ingredients that are biodegradable and odorless. Simply brew two cleaning K-cups and all the excess mineral deposits and leftover coffee are washed away. For use in Keurig brewers only.

Urnex also offers another descaling solution with their liquid product. The same biodegradable and odorless ingredients are used in this liquid to ensure your machine is left with no chemical residue. All you have to do is pour the liquid into the machine's water reservoir, add more water and then brew three times. For use in most coffee makers.

DeZcal™ is a citric acid-based, non-toxic and biodegradable descaler that breaks down Mineral deposits in your brewer. Regular cleaning of your Keurig coffee maker using this product will help keep it in tip top shape and ensure that your coffee is perfect each and every time. For use in other home coffee makers, pod/capsule and espresso machines.

Removal of Excess Grinds and Muck from Brewing Basket

Coffeecow.com has a further webpage: http://www.coffeecow.com/PublicPages/ProductDetail.aspx?Qstring=1260_0_40_-1_-1_advertises a product "Cleancup Single Cup Brewer Cleaning Cups" that mentions:

CleanCup Single Cup Brewer Cleaning Cups allow Keurig owners to quickly and easily clean their Keurig brewing basket. All ingredients used are biodegradable, odorless, and phosphate-free. Simply insert the CleanCup into your Keurig machine, brew two cups from one cleaning cup and enjoy fresh, truly clean coffee. 5 CleanCups in each box.

Regardless of whether you prefer light roast, medium roast, or dark roast coffee, every coffee lover knows that a cup of coffee needs to be cleanly and freshly brewed at all times for it to taste great. Unfortunately for Keurig machine owners, this means having to thoroughly clean their coffee machines, which can take a lot of time to complete.

At least, this was the case before CleanCup created the single cup brewing chamber cleaning cup. Now, thoroughly cleaning a Keurig machine's K-Cup brew chamber is a snap. All it takes is two brews of the same cleaning K-cup and all the excess grinds and muck that are accumulated in your machine's K-Cup holder will be washed away. The cleaning cup even works in all Keurig single-cup brewing devices, ensuring that every Keurig user can have the cleanest-tasting, freshest cup of Joe whenever he or she wants it. Make sure to brew twice following the cleaning process without any K-Cups in the chamber to rinse the brew chamber.

Urnex CleanCup's revolutionary cleaning K-cups are made from ingredients that are biodegradable and odorless as well. This further helps ensure that every cup brewed from your newly cleaned machine contains no residue from the cleaning process. By using a single k-cup once a week to clean your Keurig brew basket, you'll have fresh coffee for a long time to come. Includes 5 cups per box.

Cotton Water Retention Capabilities

A commonly used absorbent fiber is cotton, but there are others that are more absorbent like modal/micromodal, tencel, and other viscose-based fibers. Suitable organic substitutes for cotton include hemp and bamboo.

Cotton balls are soft balls made of cotton. Cotton absorbs water—as much as twenty-seven times its weight. Further, an article entitled "Retention by Cotton Fabric During Centrifuging" by L. Loeb is published in "Textile Research Journal" (1963) that is available online at: http://trj.sagepub.com/content/33/7/521.full.pdf. The article mentions that, as concerns the retention of water by cotton:

water is held in assemblies of moist cellulosic fibers in at least three different ways. In order of increasing firmness of attachment theses are: (1) Capillary water held in the spaces between fibers and in the surface serrations of the fiber wall. (2) Solid solution of water with the non-crystalline element of the fiber. Hydrate water which is chemically bound to molecules of the fiber. Regardless of the exact nature of the bonding, it is the water held by mechanisms (2) and (3) which is responsible for changed in the intrinsic fiber properties which occur on wetting . . . .

Surface tension of liquid being expelled. It is shown that the water retention can be reduced by reducing the surface tension of the wetting liquid. This may be accomplished either by increasing the temperature of the wetting liquid or by addition of surface active additives. In either case the retention decreases linearly as surface tension is reduced.

Thickness of the fabric bed. The thickness of the fabric bed is shown to be an important variable in controlling water retention in any given cycle. Retention decreases as thickness increases.

It is desired to shorten the necessary time to complete a cleaning procedure to machines that utilize single dose beverage filter cartridges over conventional techniques and yet do so with cleaning agents that are not harmful if consumed.

SUMMARY OF THE INVENTION

One aspect of the invention resides in a container within which is a liquid absorbing material that is wetted by a wetting liquid. The liquid absorbing material has a liquid retention characteristic for retaining the vinegar. The liquid retention characteristic is such that the liquid retention ability reduces as a surface tension of the wetting liquid reduces.

The surface tension of the wetting liquid reduces as a temperature of the wetting liquid rises over time. The temperature of the wetting liquid rises when water at a higher temperature comes into contact with the wetting liquid. Preferably the liquid absorbing material is cotton and the wetting liquid is vinegar, such as apple vinegar.

Another aspect of the invention resides in an apparatus that releases vinegar from a container over time by heating the vinegar with hot water passing through punctures in the container's cover and bottom to form inlet and outlet openings. Hot water passes through the container by entering through the inlet opening and exiting via the outlet opening.

In so doing, heat from the hot water transfers to the vinegar saturating a water absorbing material such as cotton that is within the impermeable cup-shaped container. Such heat transfer causes the temperature of the vinegar to rise, reducing the surface tension of the vinegar, which results in the liquid retention ability of the liquid absorbing material to reduce to free the vinegar from further retention. The vinegar then mixes with the hot water passing through. Since the liquid absorbing material has a thickness, it takes some time for heat from the hot water to penetrate so the vinegar saturating the liquid absorbing material is freed from the liquid retention of the liquid absorbing material gradually over time to mix with the hot water.

BRIEF DESCRIPTION OF THE DRAWING

For a better understanding of the present invention, reference is made to the following description and accompanying drawings, while the scope of the invention is set forth in the appended claims.

DESCRIPTION OF THE PREFERRED EMBODIMENT

Figure 1:
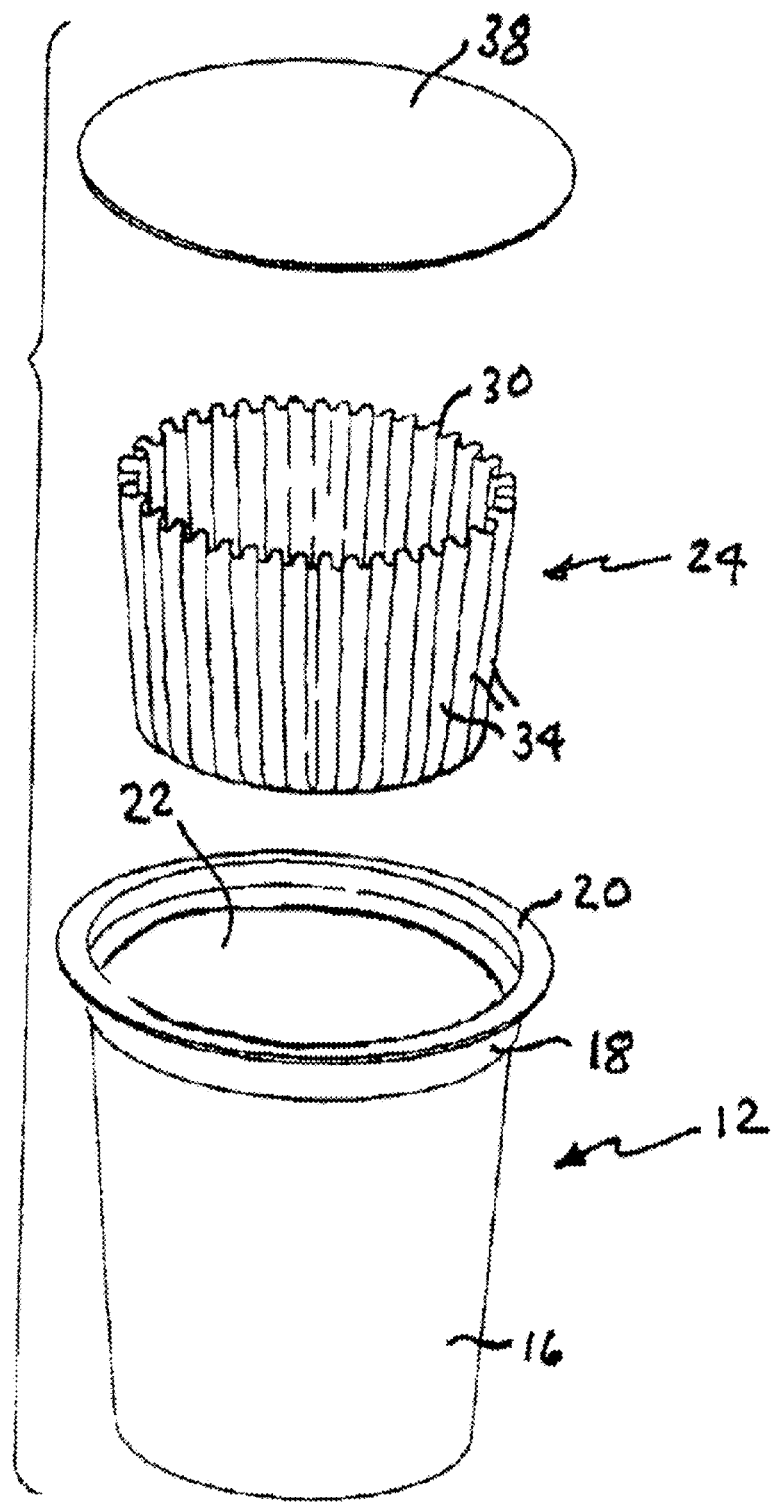
FIG. 1 shows a schematic exploded view of components of a conventional beverage filter cartridge in accordance with US Patent Application Publication No. 2005/0051478.

Turning to the drawing, FIG. 1 shows a conventional beverage filter cartridge with an open top container 12 containing a filter element 24 and closed by a cover 38 in accordance with US Patent Application Publication No. 2005/0051478, whose contents are incorporated by reference.

In accordance with the present invention, a cotton ball 10 is wetted by apple vinegar and placed into confines of the container 12 of FIG. 1. The container 12, which may be cup-shaped, has an open top that is closed and sealed hermetically by a cover 38 that renders the contents of the container 12 impermeable to liquid and gas.

The reason apple vinegar was chosen as opposed to distilled vinegar to add some reassurance to a consumer purchasing the cleaning container product. The fragrance or odor of the apple vinegar is more appealing and thus more reassuring to the user that the cleaning product (apple vinegar) is safe even if some remnant found its way into the beverage itself during subsequent brewing cycles. Thus, such reassurance eliminates the potential for giving rise to a perception that drinking the prepared beverage immediately after the cleaning procedure might be harmful if consumed due to remnants of the cleaning agent entering the beverage.

A conventional beverage filter cartridge is commercialized under the name K-cup, but contains ingredients suited for making a beverage to be consumed. The Keurig single serve beverage filter cartridge machine punctures the cover of a disposable single serve beverage filter cartridge known as the K-cup and also punctures the underside of the K-cup to create inlet and outlet openings respectively for the passage of hot water from the machine through the K-cup.

The inventors emptied a conventional K-cup and put the cotton wetted with apple vinegar into the K-cup and used it with a Keurig single serve beverage filter cartridge machine in the same manner that the K-cup is otherwise used to prepare single serve beverages. However instead of making a beverage, the machine passes the apple vinegar released from the wetted cotton through its flow passages to descale or cleanse the machine of accumulated excess grinds and muck.

The reason for placing cotton inside the K-cup was to make an impression upon a would be purchaser that there is something substantial to the product beside just liquid if the K-cup is shaken in their hand. For that reason, a cotton wisk was inserted into the impervious cup-shaped container so that when one shook the impervious cup-shaped container, one could hear the cotton wisk rattling back and forth and thus realize there is more to the product than just liquid. A cotton ball was found to be suitable substitute for the cotton wisk.

During the cleaning procedure, the container is punctured with inlet and outlet tubes to enable heated water to pass through the impervious cup-shaped container, thereby heating its contents and causing its contents to mix with the heated water as the heated water passes through.

Figure 2:
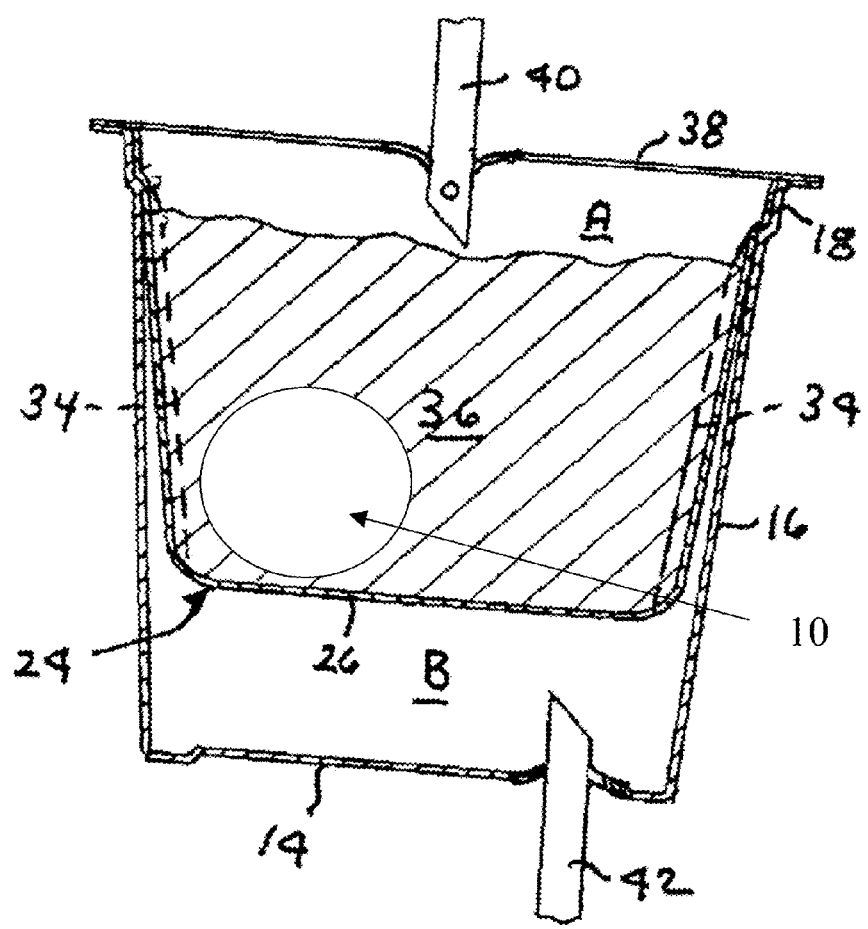
FIG. 2 shows a schematic cross-section of the conventional beverage filter cartridge of FIG. 1 after assembly with a cotton ball wetted by vinegar placed inside the container in accordance with the invention and with conventional inlet and outlet tube punctures of a conventional machine that uses beverage filter cartridges to pass hot water through the container.

Turning to FIG. 2, the weight specification is two grams of cotton 10 per cup (container 12). The quantity of apple vinegar is 37.5 milliliters per cup (container 12). Further experimentation revealed that eliminating 7.5 milliliters of apple vinegar that was in excess of the amount wetting (or saturating) the cotton proved satisfactory for effective cleaning. In other words, all that needs to be within the container is the cotton wetted by the apple vinegar. A ratio of 2 grams:30 milliliters of liquid absorbing material to wetting liquid is sufficient and the same ratio can be applied for containers of larger or smaller sizes. For instance, a container that is ½ the size of a conventional K-cup, the same ratio of 1:15 would apply so that about one gram of liquid absorbing material and about 15 milliliters of wetting liquid would suffice to yield comparable cleaning results for the smaller container.

Turning to FIG. 1, the conventional beverage filter cartridge includes the container 12, which is an impermeable cup-shaped container having a container bottom wall and a side wall 16 diverging upwardly to a collar 18 having a peripheral lip 20 surrounding a top opening 22.

As herein employed, the term "impermeable" means substantially resistant to the passage therethrough of liquids and gases. The container 12 may be formed of any one of many commercially available materials, e.g., polystyrene, polyethylene, polypropylene, laminated composites thereof, etc.

Turning to FIG. 2, preferably cotton 10, which may be in the form of a cotton wick or a cotton ball, is wetted by distilled vinegar or any kind of vinegar, such as apple vinegar. The wetted cotton is received in the first mentioned chamber A via the container top opening 22. The total weight of the cotton 10 is preferably two grams. If the cotton is in the form of a cotton ball, it may have a one-inch diameter if generally spherical. Otherwise, if generally cubic, the cotton ball may have a dimension of one-inch (height) by one-inch (width) by one-inch (depth). A cotton wick is generally cylindrical, but can have approximately the same overall volume as the cotton ball. The cotton ball of 2 grams weight can retain 30 milliliters of the apple vinegar—such a wetted cotton ball in effect is saturated.

A cover 38, which may be impermeable, is heat sealed to the peripheral lip 20 of the container sidewall 16. The cover 38 may be formed of a plastic, metallic foil, or any laminated composite thereof. In accordance with conventional practice, oxygen may be purged from the container interior by the introduction of an inert gas, e.g., nitrogen, prior to sealing the cover in place.

The filter element 24 has a substantially flat bottom 26 and a sidewall diverging upwardly to an upper rim 30. The filter element is permeable to liquids, and again may be formed from commercially available materials, e.g., paper or polymer materials. The filter element 24 is received in the container 12 with its bottom 14 spaced both inwardly from the container sidewall 16 and vertically from the container bottom. The upper rim 30 of the filter is joined, as by heat seal at a peripheral juncture, to the interior of the container sidewall 16 in the vicinity of collar 18. When thus positioned, the filter element subdivides the interior of the container into a chamber A accessible via the top opening 22 of the container 12, and a further chamber B disposed between the filter and container bottoms 26, 14.

The filter sidewall is configured to provide exterior channels indicated typically at 34 that face the interior of the container sidewall 16 and that lead downwardly from the peripheral juncture 32 to the further chamber B.

During a brewing cycle, the cover 38 is pierced by a tubular inlet probe 40 to admit heated liquid 36 (e.g., hot water) into chamber A for infusion with the vinegar to produce a heated mixture of water and vinegar. The permeability of the filter element 24 accommodates a flow therethrough of the mixture into the second chamber B. The channels 34 provide critical exit passageways for the mixture permeating through the filter sidewall and in so doing encourage full saturation of the mixture in areas adjacent to the container sidewall 16.

The container bottom 14 is pierced by a tubular outlet probe 42 to accommodate an outflow of the mixture from the cartridge. The vertical spacing of the filter bottom 26 from the container bottom 14 insures that the filter will be safeguarded from inadvertent puncture by the outlet probe 42. The channels 34 are a fluted or pleated configuration in the filter sidewall as shown in FIG. 1.

While the filter element 24 is depicted in FIGS. 3 and 4, the filter element 24 may be dispensed with entirely in accordance with the invention such that the container 12 serves as a container that only contains the liquid absorbing material (e.g., cotton balls 10) wetted by the apple vinegar. The cover 38 hermetically seals in a closed manner the open top of the container 12. The cover 38 and the bottom of such a container are pierced to form the inlet and outlet openings 40, 42 respectively.

The tubular inlet probe 40 and the tubular outlet probe 42 are part of a conventional beverage filter cartridge machine that utilizes disposable single serve beverage filter cartridges to prepare and dispense beverage in single serve doses.

To effect the cleaning operation, the first 30 seconds of cleaning entails passing a mixture of released apple vinegar from the wetted cotton balls and hot water through flow passageways of the beverage filter cartridge machine. The hot water temperature is generally within the range of between 195 degrees Fahrenheit and 205 degrees Fahrenheit, which temperature range is beyond a threshold temperature needed to release the vinegar from being continuing to be retained in the wetted cotton. Such release can been observed in the beverage filter cartridge machine flow passageways since the apple vinegar has its own color, which is not clear as is the case for the hot water. The observation of such color may give some solace to the user that the cleaning agent is present and reaching the flow passageways of the beverage filter cartridge machine. Once the first 30 seconds of cleaning is done, water will continue brewing for 35 seconds (additional) for a total of 1 minute 5 seconds for the complete cleaning cycle. This overall cleaning time is considerably shorter in duration than conventional cleaning instructions call for, such as cycling the brewing as much as four times to complete the cleaning procedure.

A comparison between conducting the cleaning operation without the cotton, i.e., just the apple vinegar, and with the wetted cotton (wetted with apple vinegar) revealed that effective cleaning in the allotted time only occurred when the wetted cotton was in the container. Without the cotton present, all the apple vinegar present flushed out right away as opposed to releasing over time as the temperature rose due to heat exchange with the hot water so the inventors attribute the presence of the cotton as responsible for the better cleaning capability than for the situation without the cotton.

While the foregoing description and drawings represent the preferred embodiments of the present invention, it will be understood that various changes and modifications may be made without departing from the scope of the present invention.

What is claimed is:
1. An apparatus suited to descale flow passages of a beverage filter cartridge machine; comprising:
   a liquid absorbing material retaining a wetting liquid so as to be in a wetted condition, the liquid absorbing material losing retention of the wetting liquid to effect release of the wetting liquid from the liquid absorbing material as a temperature of the wetting liquid increases beyond a threshold temperature at which a surface tension of the wetting liquid reduces to enable the release, the wetting liquid being vinegar;
   a container within whose confines is the liquid absorbing material in the wetted condition, the container having an open top and a closed bottom and a sidewall extending from the closed bottom to define the open top; and
   a cover closing the open top of the container.

2. The apparatus of claim 1, wherein the liquid absorbing material is cotton and the vinegar is apple vinegar.

3. The apparatus of claim 1, wherein the liquid absorbing material is selected from the group consisting of cotton, hemp, bamboo, tencel, and modal/micromodal and any combination thereof.

4. The apparatus of claim 1, wherein the cover is pierced and the bottom of the container is pierced to form inlet and outlet openings that accommodate passage of heated liquid through the container that enters via the inlet opening and exits via the outlet opening.

5. The apparatus of claim 1, further comprising means for increasing the temperature of the wetting liquid by heat exchange with a heated liquid coming into contact with the liquid absorbing material in the wetted condition, said means including a piercing in the cover and a piercing in the bottom of the container to form inlet and outlet openings that accommodate passage of the heated liquid through the container to increase the temperature of the wetting liquid that enables the wetting liquid to release from the liquid absorbing material to form a mixture with the heated liquid because of the heat exchange, the heated liquid entering the container via the inlet opening and the mixture exiting the container via the outlet opening to descale flow passages.

6. The apparatus of claim 1, further comprising beverage preparing means for heating water, said beverage preparing means having means for puncturing said cover and said container to create both an inlet opening and an outlet opening in said cover and said container respectively, said beverage preparing means being configured to direct the heated water into the container via the inlet outlet and to heat the wetting liquid enabling release of the wetting liquid from the liquid absorbing material to mix with the heating water so that the mixture exits the container via the outlet opening to descale flow passages of the beverage preparing means.

7. The apparatus of claim 6, further comprising a filter element within confines of the container.

8. The apparatus of claim 7, wherein a mixture of the wetting liquid and the heated water are liquid contents within the container, the filter element having a filter bottom and a filter sidewall extending upwardly from said filter bottom, said filter element being received in said container and directly joined at a peripheral juncture to an interior of said container sidewall, the interior of said container thus being subdivided by said filter element into a first chamber accessible via said open top and a second chamber, wherein radially outer portions of the filter side wall below the peripheral juncture in an upper region of the filter sidewall are in contact with the container sidewall, and pleats or flutes in said filter sidewall form exit channels in the upper region between the container sidewall and the filter sidewall leading to said second chamber, the exit channels in the upper region providing exit passageways for the liquid contents permeating through the filter sidewall in the upper region to encourage flow through the upper region of the filter element and full saturation of the liquid contents in areas adjacent to the container sidewall, the liquid contents being received in said first chamber via said open top, said filter element being permeable to accommodate flow therethrough of the liquid contents.

9. The apparatus of claim 8, wherein the container has a frustoconical shape with said container sidewall diverging in a direction toward said cover, and wherein said filter element has a frustoconical shape and said filter sidewall diverges in a direction toward said cover.

10. The apparatus of claim 1, wherein the cover is hermetically sealed to the container.

11. The apparatus of claim 1, wherein the liquid absorbing material is at least one cotton ball.

12. The apparatus of claim 1, wherein the liquid absorbing material is at least one cotton wick.

13. The apparatus of claim 1, wherein the liquid absorbing material weighs at least two grams before being wetted by the wetting liquid.

14. The apparatus of claim 1, wherein a quantity of the vinegar wetting the liquid absorbing material within the container is at least 30 milliliters.

15. The apparatus of claim 1, wherein a ratio of weight of the liquid absorbing material in grams to a volume of the vinegar in milliliters is approximately 2 to 30 within the container.

16. The apparatus of claim 6, wherein the vinegar has color that is visible in the mixture as the mixture reaches the flow passages.

17. An apparatus suited to descale flow passages of a beverage filter cartridge machine, comprising:
    an impermeable yieldably-piercable cup-shaped outer container internally subdivided by a permeable cone-shaped filter into first and second chambers, the first chamber being configured to store a granular or powered dry beverage medium, the container being closed by an impermeable yieldably piercable lid; and
    a liquid absorbing material and apple vinegar stored in the first chamber.

18. The apparatus of claim 17, wherein the liquid absorbing material is selected from the group consisting of a wick, cotton, hemp, bamboo, tencel, and modal/micromodal and any combination thereof.

19. A method suited to descale flow passages of a beverage filter cartridge machine, comprising:
    providing an outer container that is impermeable yieldably-piercable and cup-shaped and internally subdivided by a permeable cone-shaped filter into first and second chambers, the first chamber being configured to store a granular or powered dry beverage medium, the container being closed by an impermeable yieldably piercable lid;
    storing a liquid absorbing material and apple vinegar in the first chamber;
    piercing the cover to admit heated water during a brewing cycle for infusion with the vinegar to produce a heated mixture of water and vinegar;
    exiting the mixture through passageways of the permeable cone-shaped filter that promote full saturation of the mixture in areas adjacent a sidewall of the outer container to descale or cleanse of accumulated excess grinds and muck; and
    piercing a bottom of the outer container to accommodate outflow of the mixture from the permeable cone-shaped filter.

20. The method of claim 19, wherein the liquid absorbing material is selected from the group consisting of a wick, cotton, hemp, bamboo, tencel, and modal/micromodal and any combination thereof.

* * * * *